United States Patent [19]

Okumura

[11] Patent Number: 4,658,134
[45] Date of Patent: Apr. 14, 1987

[54] DIGITAL TAPE MEASURE
[75] Inventor: Kazuyoshi Okumura, Joyo, Japan
[73] Assignee: Kyoto Measuring Instruments Corp., Kyoto, Japan
[21] Appl. No.: 774,894
[22] Filed: Sep. 11, 1985
[30] Foreign Application Priority Data Apr. 4, 1985 [JP] Japan .................................. 60-71998

[51] Int. Cl.$^4$ ........................... G01D 5/34; G01B 3/12
[52] U.S. Cl. .................................... 250/231 R; 33/140
[58] Field of Search ..................... 33/125 C, 138, 139, 33/140; 250/231 R, 237 G; 356/395

[56] References Cited

U.S. PATENT DOCUMENTS 4,242,574 12/1980 Grant ................................. 33/140 X

FOREIGN PATENT DOCUMENTS 55130206 3/1970 Japan .

Primary Examiner—Eugene R. LaRoche
Assistant Examiner—Steven J. Mottola
Attorney, Agent, or Firm—Brumbaugh, Graves, Donohue & Raymond

[57] ABSTRACT

A digital tape measure comprising a tape stored in a casing body being wound on a reel so as to be movable corresponding to a length of measuring object when drawn out and on which a detection mark is indicated and a photoelectric transfer element for receiving a light projected to the tape and reflected therefrom and converting the light to an electric signal, the combination with a control roller for controlling a moving state of the tape on the moving passage which is disclosed between the reel and photoelectric transfer element to form a spacing corresponding to an allowance of the focal distance of the photoelectric transfer element between the roller surface and the tape surface.

2 Claims, 7 Drawing Figures

DIGITAL TAPE MEASURE

BACKGROUND OF THE INVENTION

1. Field of the Invention

The present invention relates to a digital tape measure in which a tape is stored in a casing body and is movable being drawn in and out through an aperture of the casing body, the amount of movement of the tape is detected by photoelectric detecting means, and the detected signal is processed so that the measure length may be digitally displayed.

2. Prior Art

Generally, when a detection mark for measuring length given on the tape at equivalent interval is detected by means of photoelectric transfer (conversion) element, it is necessary for the tape to pass through a portion which is distant from the photoelectric transfer element by a length corresponding to the focal length of the photoelectric transfer element. This is because the quantity of reflecting light given to the photoelectric transfer element is insufficient when the distance between the photoelectric element and the tape is too large, while the output wave from the photoelectric element is influenced by the diffraction when the distance is too small, and in both cases the detection mark for measuring length cannot be exactly read.

Accordingly, it is conventional to hold the tape between compression rollers so that the tape is prevented from oscillation when it is drawn out. In particular, in order to ensure the exact movement of the tape keeping the focal distance, a method was already proposed wherein a guide plate is provided at the position distant from the photoelectric transfer element by a length corresponding to the focal length, and a tape is held between the rollers at the positions before and behind the guide plate so that the tape may be moved while sliding on the guide plate, as is exemplified in Japanese Utility Model Publication (unexamined) No. 55-130206.

However, in case that the tape is compressively held between the rollers as mentioned above, unless the rolling friction of the rollers is small, it is difficult to rewind and accept the tape into the casing by using the elasticity of the rewinding spring connected to the inner end of the casing. Also in case that the tape is slid on the guide plate while being held between the rollers, the movement of the tape meets with resistance.

The compression of rollers to the tape brings about stain or peeling of the detection mark for measuring length given on the surface of the tape, and sometimes deterioration of reflection efficiency is caused thereby.

In case that the tape is made of steel and of which cross section is circular arc so as to keep linear by the proper elasticity when drawn out to a certain length, since the friction is increased when the tape is compressively held by the rollers, the above-described problem is particularly serious.

SUMMARY OF THE INVENTION

Accordingly, it is an object of the present invention to provide a novel digital tape measure in which the tape is securely controlled by a roller or the like so as not to oscillate up and down when the tape is drawn out of the casing body and passes a position which is distant by a length corresponding to the focal length of the photoelectric transfer element, thereby solving the above-discussed problem, and in which the control by the rollers is given within a limited range so as not to interfere with the rewinding of the tape, avoiding thereby stain of the detection mark indicated on the tape as well as excess or shortage of quantity of light received by the photoelectric transfer element.

The foregoing object is accomplished by providing a digital tape measure comprising a tape stored in a casing being wound on a reel so as to be movable corresponding to the length of an object to be measured when drawn out and on the surface of which a detection mark for measuring length is indicated, and a photoelectric transfer element for receiving a quantity of light projected to said tape and reflected therefrom and for converting the light to an electric signal so that the detection mark for measuring length indicating the movement of the tape is optically detected for the measurement, characterized in that a control roller for controlling positionally the movement of the tape on the moving passage thereof is disposed between said reel and said photoelectric transfer element so as to form a spacing corresponding to the allowance of the focal distance of said photoelectric transfer element between the surface of said roller and the surface of the tape on the side facing thereto at the initial stage of drawing out the tape. A digital tape measure according to the present invention is also characterized in that said photoelectric transfer element is accepted in a holding block supported by said casing body with a constant impetus to the tape, and said holding block is so disposed as to form a spacing corresponding to the allowance of the focal distance of said photoelectric transfer element between the detecting top face of the photoelectric transfer element and the surface of the tape on the side facing to the top face.

By the foregoing arrangement, since the control roller is disposed at the position distant from the tape by the distance corresponding to the allowance of the focal distance of the photoelectric transfer element, the tape does not come in contact with the control roller so long as it is stably drawn out being slid on the casing body, and when the tape is unstably oscillated, it comes in contact with the control roller avoiding thereby such excessive oscillation as occurring the decline of resolving power by the excess or shortage of the quantity of light received by the photoelectric transfer element.

When the control roller is not disposed and the holding block is disposed instead so as to form the spacing corresponding to the allowance of the focal distance of the photoelectric transfer element, since the holding block is always pressed to the tape, even when the tape oscillates and approaches to the photoelectric transfer element, the oscillation is restrained by the holding block so as not to exceed the allowable focal distance.

Thus, in the digital tape measure according to the present invention, the tape is not constantly controlled by the fixed member contacting the tape but controlled only when drawn out amount of the tape is so increased as to occur excessive oscillation, either by the provision of the control roller or by the acceptance of the photoelectric transfer element in the holding block supported by the casing body while the photoelectric transfuer element being always urged to the tape so that the oscillation of the tape is restricted within the range of the allowance of the focal distance of the photoelectric transfer element. Accordingly, the excessive resistance can be avoided at the time of drawing the tape in and out permitting the tape to be smoothly drawn out and rewound. Furthermore, such disadvantaqe as stain or peeling caused by compressing constantly the detection mark indicated on the surface of the tape can be sufficiently prevented, and thus the oscillation of the tape is successfully controlled without measuring error caused by the excess or shortage of the quantity of light received by the photoelectric transfer element.

BRIEF DESCRIPTION OF THE DRAWINGS

Other objects and features of the present invention will be seen in connection with the accompanying drawings in which.

DESCRIPTION OF THE PREFERRED EMBODIMENTS

Referring now to the accompanying drawings, several embodiments of the present invention are described in detail hereunder.

Figure 1:
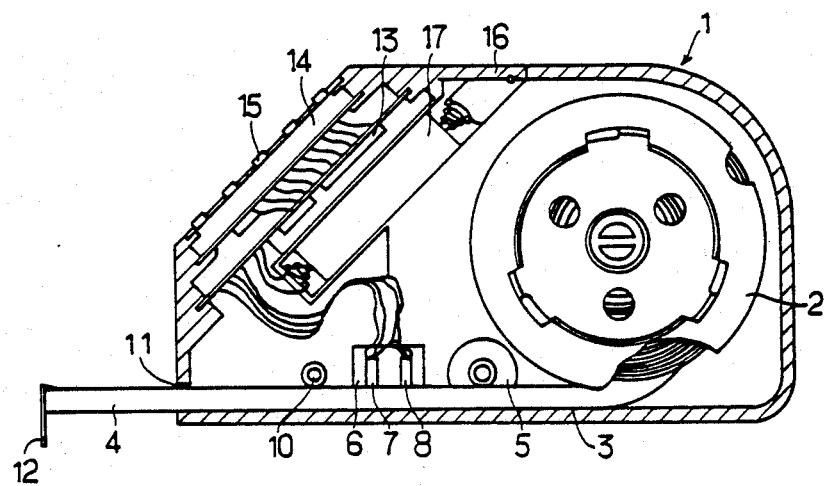
FIG. 1 is a longitudinal sectional view of a digital tape measure embodying the first invention.
Figure 2:
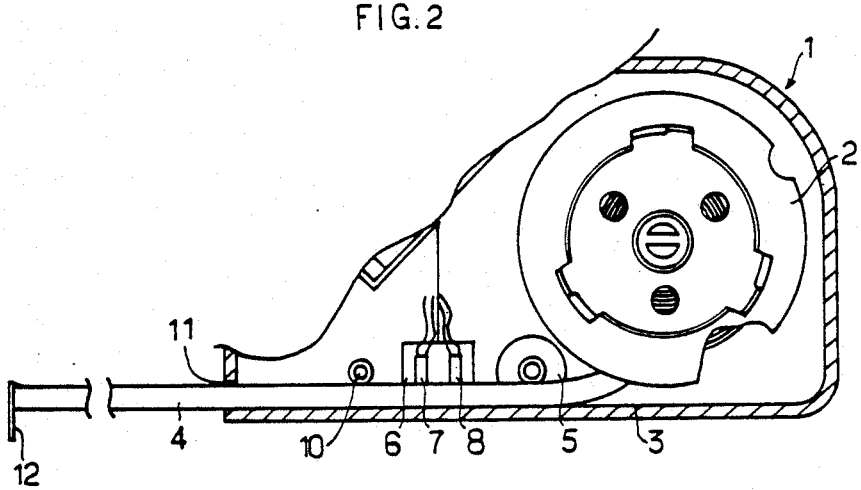
FIG. 2 is a partially longitudinal sectional view showing a state of use of the digital tape measure embodying the first invention.
Figure 4:
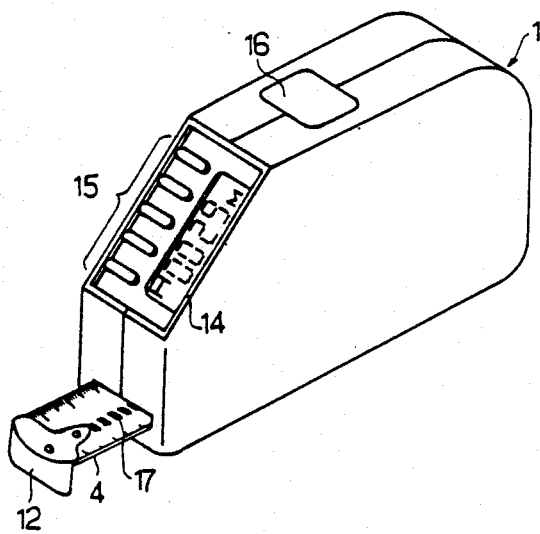
FIG. 4 is a perspective view of the digital tape measure embodying the first or second invention, and FIGS. 5 (a), 5(b), 5(c) are partially sectional views respectively showing each principal part of FIGS. 1, 2 and 3.

In FIG. 1 showing a longitudinal sectional view of a digital tape measure as an embodiment of the first invention and FIG. 4 showing the appearance thereof, an end of a tape (4) is connected to a spiral spring not illustrated at the inner part of a casing body (1) of the digital tape measure and accepted therein being wound on a reel (2). The tape (4) is made of steel, circular arc in cross section, and is formed so as to keep a straightness against empty weight by the elasticity of the tape (4) itself. The tape (4) is drawn out through an aperture (11) of the casing body (1) by pulling an end hook (12). At this time, the tape (4) is slidingly moved along the inner bottom side (3) of the casing body while being drawn out of the reel (2). The movement of the tape (4) is controlled by a control roller (5). As is described later, when the tape (4) is slidingly moved on the inner bottom side (3) of the casing and passes through the area in front of photoelectric transfer elements (7), (8), the movement of the tape (4) is controlled by this roller (5) so as not to displace exceeding the allowable focal distance. The aperture (11) is provided with a guide roller (10) of which function is described later. A detection mark (17) for measuring length is given on the bottom part of a surface of the tape (4), and when moving the tape (4), the amount of movement thereof is detected by the photoelectric transfer elements (7), (8) mounted on a holding block (6) and the detected signals processed by a signal processor (13) for calculation. Then the result of calculation is displayed on the display unit (14). The electric power necessary for each of these parts is supplied from a power source battery (17) by way of a cover (16). FIG. 2 shows a state of the tape (4) drawn out to a large extent, and in which a diameter formed by the tape wound on the reel (2) is rather small. FIG. 2 also shows that the tape is drawn out of the reel (2) being inclined.

Figure 5A:
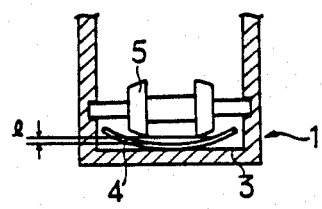
Figure 5B:
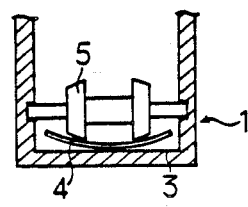
Figure 5C:
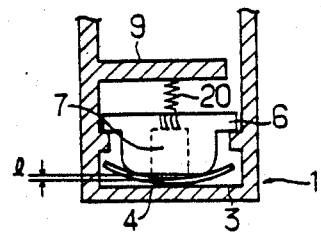

With respect to the function of the control roller (5), FIG. 5 (a) is a partially sectional view of the roller (5) at the state shown in FIG. 1, and FIG. 5 (b) is partially sectional view thereof at the state shown in FIG. 2. As shown in FIG. 5, the middle part of the cylindrical periphery of the control roller (5) is entirely cut out, and respective peripheral surfaces of remaining larger diameter parts of both ends thereof are formed so as to come in contact with both side edges of the sectionally circular arc tape (4). Such formation is adopted in order to prevent the detection mark (17) given to the center part of the surface of the tape (4) from coming in contact with the control roller (5) at the time of controlling the oscillation of the tape (4) by the contact of the roller (5) with the tape (4), thereby preventing the detection mark (17) from stain or peeling, i.e., deterioration of the photoelectric reflection efficiency. Furthermore, the control roller (5) is pivoted so as to form a spacing (l) between the larger diameter parts of the roller and the center part of the surface of the tape during the period of sliding contact of the tape with the bottom part (3). This spacing (l) is set to be within the range of allowance of the focal distance of the photoelectric transfer elements (7), (8).

When the tape (4) is drawn out to a small extent and the diameter of the tape wound on the reel (2) still remains large, as is shown in FIG. 5 (a), the straighteness of the tape is exhibited and the tape (4) is slidingly moved along the bottom side (3), the spacing (l) between the control roller (5) and the surface of the tape being kept thereby. When the tape (4) is drawn out to such a large extent that the diameter of the tape wound on the reel (2) is much reduced, since the tape comes to be obliquely drawn out from the reel (2) and the contact portion with the bottom side (3) of the casing becomes gradually more distant from the reel (2), the spacing produced by drawing out the tape and across which the tape is extended becomes longer or larger, and the oscillation is easy to occur. In this case, the tape (4) is oscillated as shown in FIG. 5 (b) at the time of being drawn out and does not slidingly moves along the bottom side (3) but moves waving away from the bottom side (3). However, since the tape comes in contact with the larger diameter part of the control roller (5), the oscillation or displacement is restricted to an allowable range. Namely, the amount of displacement caused by the oscillation of the tape (4) does not exceed the allowable distance since the spacing (l) is established so as to restrict the amount of displacement within the range of the allowance of the focal distance of the photoelectric transfer elements.

Figure 3:
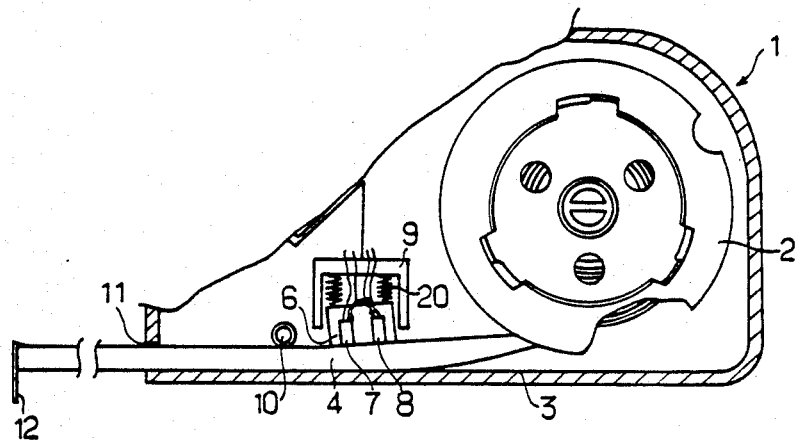
FIG. 3 is a partially longitudinal sectional view of another digital tape measure embodying the second invention.

FIG. 3 is a partially longitudinal sectional view of the digital tape measure shown in FIG. 2 as a second embodiment of the invention and in which the same reference as FIG. 1 is designated to the same part. In this second embodiment, in place of the control roller, a holding frame (9) is provided for the holding block (6) accepting the photoelectric transfer elements (7), (8), and these members are connected with an elastic member (20) to give the oscillation control to the tape (4). In other words, as shown in the partially sectional view of FIG. 5 (c), the holding block (6) is always pressed to the tape side (4) by the elastic member (20), but the spacing (l) is formed between the photoelectric transfer element (7) and the upper surface of the tape (4) which slidingly contacts the bottom side (3) of the casing body. This spacing (l) is established to be within the allowance of the focal distance of the photoelectric transfer element in the same manner as the foregoing first invention. Accordingly, with the increase of the drawn out length of the tape (4), when the tape (4) becomes easy to oscillate corresponding to the change (reduction) of the diameter wound on the reel (2), the holding block (6) comes also to oscillate following the oscillation of the tape. However, since the tape (4) is pressed by the elastic member (20) with an impetus thereto and returned to the due position keeping the allowance of the focal distance of the photoelectric transfer element, the oscillation of the tape is successfully controlled.

It should also be understood that the foregoing relates to only preferred embodiments of the invention, and that it is intended to cover all changes and modifications of the example of the invention herein chosen for the purposes of the disclosure, which do not constitute departures from the spirit and scope of the invention.

What is claimed is:

1. A digital tape measure, comprising: a tape stored in a casing being wound on a reel so as to be movable corresponding to a length of an object to be measured when drawn out and on the surface of which a detection mark for measuring length is indicated, and a photoelectric transfer element for receiving a quantity of light projected to said tape and reflected therefrom and for converting the light to an electric signal so that the movement of the tape is measured by optically detecting the detection mark for measuring length indicated on the tape, characterized in that said photoelectric transfer element is accepted in a holding block supported by said casing body with a constant impetus to the tape, and said holding block is disposed so as to form a spacing corresponding to the allowance of the focal distance of the photoelectric transfer element between a surface of said holding block and the surface of the tape on the side facing to said surface of the holding block at the initial stage of drawing out the tape.

2. A digital tape measure, comprising: a hollow casing; a reel provided in said casing; a metal tape having a circular arc-shaped cross section and being wound on said reel so as to be tractable therefrom corresponding to a length of an object to be measured, said tape having a surface on which a detection mark for measuring length is provided; a photoelectric transfer element provided so as to receive a quantity of light projected on said tape and reflected therefrom, and convert the light to an electric signal so as to measure movement of said tape by optically detecting said detection mark; and a control roller provided so as to positionally control movement of said tape, said control roller being cylindrical and having a periphery with a middle part which is entirely cut out so as to form said roller with two large diameter parts separated by said cut out middle part, said large diameter parts being oriented so that the peripheral surfaces thereof are contactable with portions of the surface of said tape which are not provided with detection marks, said control roller being disposed between said reel and said photoelectric transfer element so as to define a space, corresponding to an allowable focal distance to said photoelectric transfer element, between the surface of said cut out middle portion of said roller and the surface of said tape provided with detection marks at an initial stage of drawing said tape from said reel.

* * * * *